US008799203B2

(12) United States Patent
Berg et al.

(10) Patent No.: US 8,799,203 B2
(45) Date of Patent: Aug. 5, 2014

(54) METHOD AND SYSTEM FOR ENCAPSULATION AND RE-USE OF MODELS

(75) Inventors: Daniel Christopher Berg, Research Triangle Park, NC (US); Brad Lee Blancett, Research Triangle Park, NC (US); Michael Damein Elder, Durham, NC (US); Chad Holliday, Research Triangle Park, NC (US); Alexander V. Konstantinou, Hawthrone, NY (US); Narinder Makin, Durham, NC (US); Timothy Allen Pouyer, Research Triangle Park, NC (US); John E. Swanke, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 12/504,511

(22) Filed: Jul. 16, 2009

(65) Prior Publication Data

US 2011/0016074 A1    Jan. 20, 2011

(51) Int. Cl.
*G06N 5/02* (2006.01)
*G06F 9/44* (2006.01)
*G06F 3/048* (2013.01)

(52) U.S. Cl.
USPC .............. 706/47; 715/769; 715/810; 717/104

(58) Field of Classification Search
None
See application file for complete search history.

(56) References Cited

U.S. PATENT DOCUMENTS

| | | | |
|---|---|---|---|
| 5,970,490 A | 10/1999 | Morgenstern | |
| 6,256,773 B1 | 7/2001 | Bowman-Amuah | |
| 6,629,065 B1 | 9/2003 | Gadh et al. | |
| 6,701,514 B1 | 3/2004 | Haswell et al. | |
| 6,789,054 B1 | 9/2004 | Maklouf | |
| 6,795,089 B2 | 9/2004 | Rajarajan et al. | |
| 7,050,872 B2 | 5/2006 | Matheson | |
| 7,069,541 B2 | 6/2006 | Dougherty et al. | |
| 7,069,553 B2 | 6/2006 | Narayanaswamy et al. | |
| 7,134,122 B1 | 11/2006 | Sero et al. | |
| 7,196,712 B2 | 3/2007 | Rajarajan et al. | |
| 7,320,120 B2 | 1/2008 | Rajarajan et al. | |
| 7,370,315 B1 | 5/2008 | Lovell et al. | |
| 7,463,263 B2 | 12/2008 | Gilboa | |

(Continued)

OTHER PUBLICATIONS

Peiris, Mulder, Cicoria, Bahree and Paathek, Pro WCF Practical Microsoft SOA Implementation, APRESS, Berkeley, CA 2007.*

(Continued)

*Primary Examiner* — Kakali Chaki
*Assistant Examiner* — Walter Hanchak
(74) *Attorney, Agent, or Firm* — Patents on Demand P.A.; Brian K. Buchheit; Scott M. Garrett

(57) ABSTRACT

A method and system are provided for encapsulation and re-use of a model. A modeling platform creates a governance contract governing the exportation and modification of elements of the model by other models. In response to a request to import at least one element of the model into a second model, the modeling platform exports the requested at least one element by reference only if the element has a governance setting that allows for exportation. In response to a request to modify at least one imported element of the model in the second model, the modeling platform determines the governance setting for the element. Then, the modeling platform modifies the element by composing the modification in the second model only if the element has a governance setting that allows modification.

19 Claims, 10 Drawing Sheets

(56) References Cited

U.S. PATENT DOCUMENTS

| | | | |
|---|---|---|---|
| 7,568,019 | B1 | 7/2009 | Bhargava et al. |
| 7,630,877 | B2 | 12/2009 | Brown et al. |
| 7,643,597 | B2 | 1/2010 | Liu et al. |
| 7,665,085 | B2 | 2/2010 | Sundararajan et al. |
| 7,669,137 | B2 | 2/2010 | Chafe et al. |
| 7,735,062 | B2 | 6/2010 | de Seabra e Melo et al. |
| 2003/0163450 | A1 | 8/2003 | Borenstein et al. |
| 2004/0179011 | A1 | 9/2004 | Marshall |
| 2006/0066627 | A1 | 3/2006 | Gerhard et al. |
| 2006/0101091 | A1 | 5/2006 | Carbajales et al. |
| 2006/0101445 | A1 | 5/2006 | Carbajales et al. |
| 2006/0235733 | A1* | 10/2006 | Marks ............ 705/7 |
| 2006/0271906 | A1 | 11/2006 | Huang et al. |
| 2007/0074203 | A1 | 3/2007 | Curtis et al. |
| 2007/0179823 | A1 | 8/2007 | Bhaskaran et al. |
| 2007/0277151 | A1 | 11/2007 | Brunei et al. |
| 2007/0288885 | A1 | 12/2007 | Brunei et al. |
| 2008/0028365 | A1* | 1/2008 | Erl ............ 717/105 |
| 2008/0127049 | A1 | 5/2008 | Elaasar |
| 2008/0183725 | A1 | 7/2008 | Blakeley et al. |
| 2008/0313008 | A1 | 12/2008 | Lee et al. |
| 2008/0313595 | A1 | 12/2008 | Boulineau et al. |
| 2008/0313596 | A1 | 12/2008 | Kreamer et al. |
| 2009/0007062 | A1 | 1/2009 | Gilboa |
| 2009/0012842 | A1 | 1/2009 | Srinivasan et al. |
| 2009/0044170 | A1 | 2/2009 | Bernardi et al. |
| 2009/0077621 | A1 | 3/2009 | Lang et al. |
| 2009/0132562 | A1 | 5/2009 | Mehr et al. |
| 2009/0171993 | A1 | 7/2009 | Arthursson |
| 2009/0249281 | A1 | 10/2009 | Fritzsche et al. |
| 2009/0278847 | A1 | 11/2009 | Berg et al. |
| 2009/0319239 | A1 | 12/2009 | Arnold et al. |
| 2009/0319467 | A1 | 12/2009 | Berg et al. |
| 2010/0030893 | A1 | 2/2010 | Berg et al. |
| 2010/0031247 | A1 | 2/2010 | Arnold et al. |
| 2010/0058331 | A1 | 3/2010 | Berg et al. |
| 2010/0077328 | A1 | 3/2010 | Berg et al. |
| 2010/0083212 | A1 | 4/2010 | Fritzsche et al. |

OTHER PUBLICATIONS

Kodali, Raghu, "What is service-oriented arthictecture?, Java world, http://www.javaworld.com/javaworld/jw-06-2005/jw-0613-soa.html", Jun. 2006, pp. 1-5.*

Parikh and Gurajada, "SOA for the Real World", Java world, http://www.javaworld.com/javaworld/jw-11-2006/jw-1129-soa.html, Nov. 2006, pp. 1-3.*

Erl, Thomas, "Introducing SOA Design Patterns", SOA World Magazine, vol. 8, Issue 6, Jun. 2008, pp. 2-7.*

Peiris, Mulder, Cicoria, Bahree and Paathek, Pro WCF Practical Microsoft SOA Impelementation, APRESS, Berkeley, CA 2007.*

Peiris, Mulder, Cicoria, Bahree and Paathek, Pro WCF Practical Microsoft SOA Impelementation, APRESS, Berkeley, CA 2007, pp. 1-475.*

Leusse, Dimitrakos, Brossard, "A Governance Model for SOA", Web Services, 2009. ICWS 2009. IEEE International Conference on.Date: Jul. 6-10, 2009, pp. 1020-1027.*

Lowry, "Programming WCF Services", O'Reilly Media Inc., Sebastopol, California, 2007, pp. 107, 549 and 555.*

Bustamante, "Learning WCF", O'Reilly Media Inc., Sebastopol, California, 2007, p. 113.*

Marks, "Service-Oriented Architecture Governance for the Services Driven Enterprise", John Wiley and Son, Inc., New York, 1 edition , Sep. 2, 2008, p. 39-40.*

Arnold, W., et al., "Pattern Based SOA Deployment," Proc. of 5th Int'l Conf. on Service-Oriented Computing (ICSOC 2007), Sep. 17-20, 2007, Lecture Notes in Computer Science (LNCS), vol. 4749, Springer 2007.

Eilam, T., et al., "Reducing the Complexity of Application Deployment in Large Data Centers," Proc. of 9th IFIP/IEEE Int'l Sym. on Integrated Network Management (IM 2005), pp. 221-234, May 15-19, 2005.

Corneil, D., et al., "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory,1979; pp. 96-109; vol. 3, pp. 96-109, 1979.

Messmer, B.T., "Efficient Graph Matching Algorithms," University of Bern, PhD thesis, Switzerland, Nov. 1995.

Tsai, W., et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

* cited by examiner

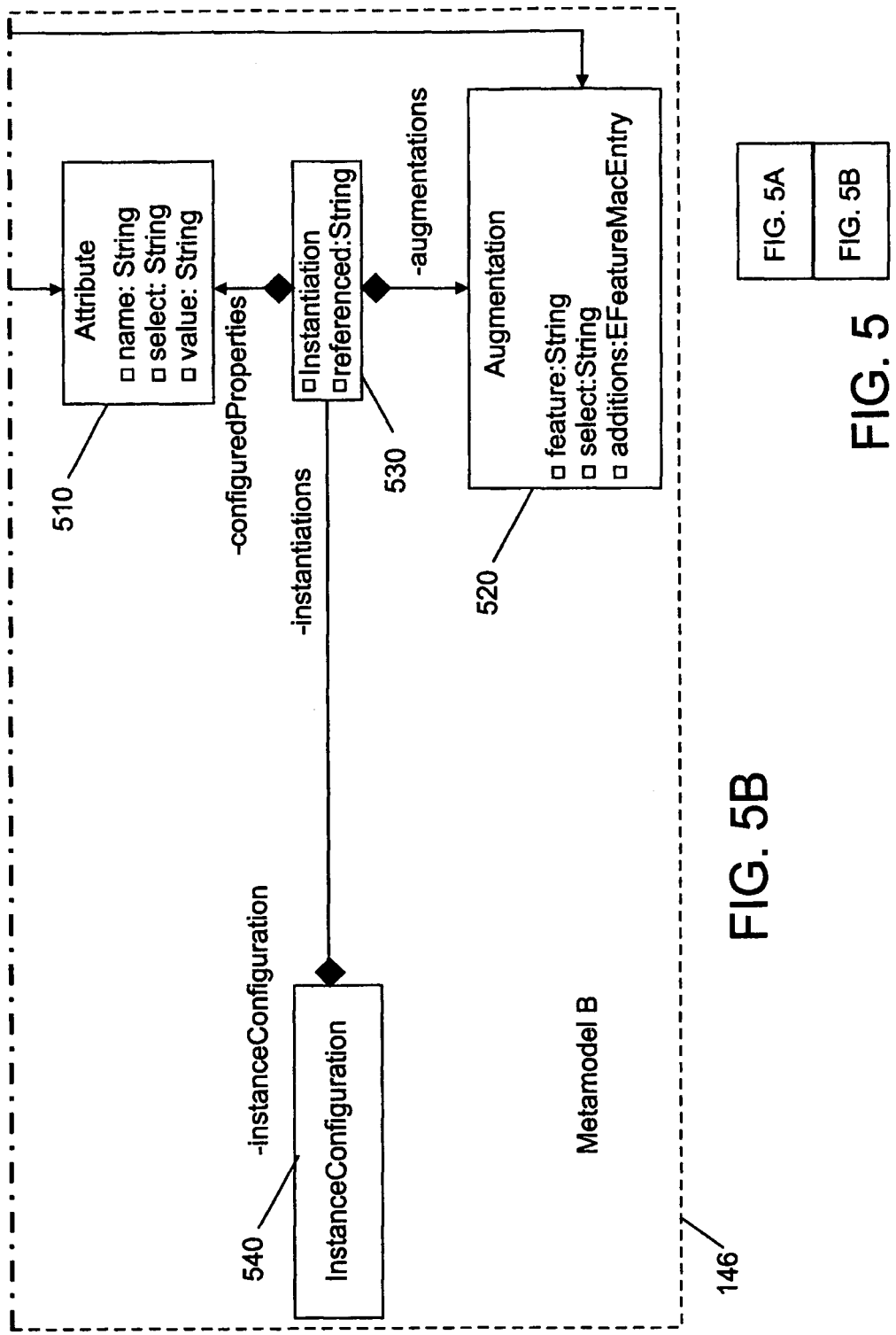

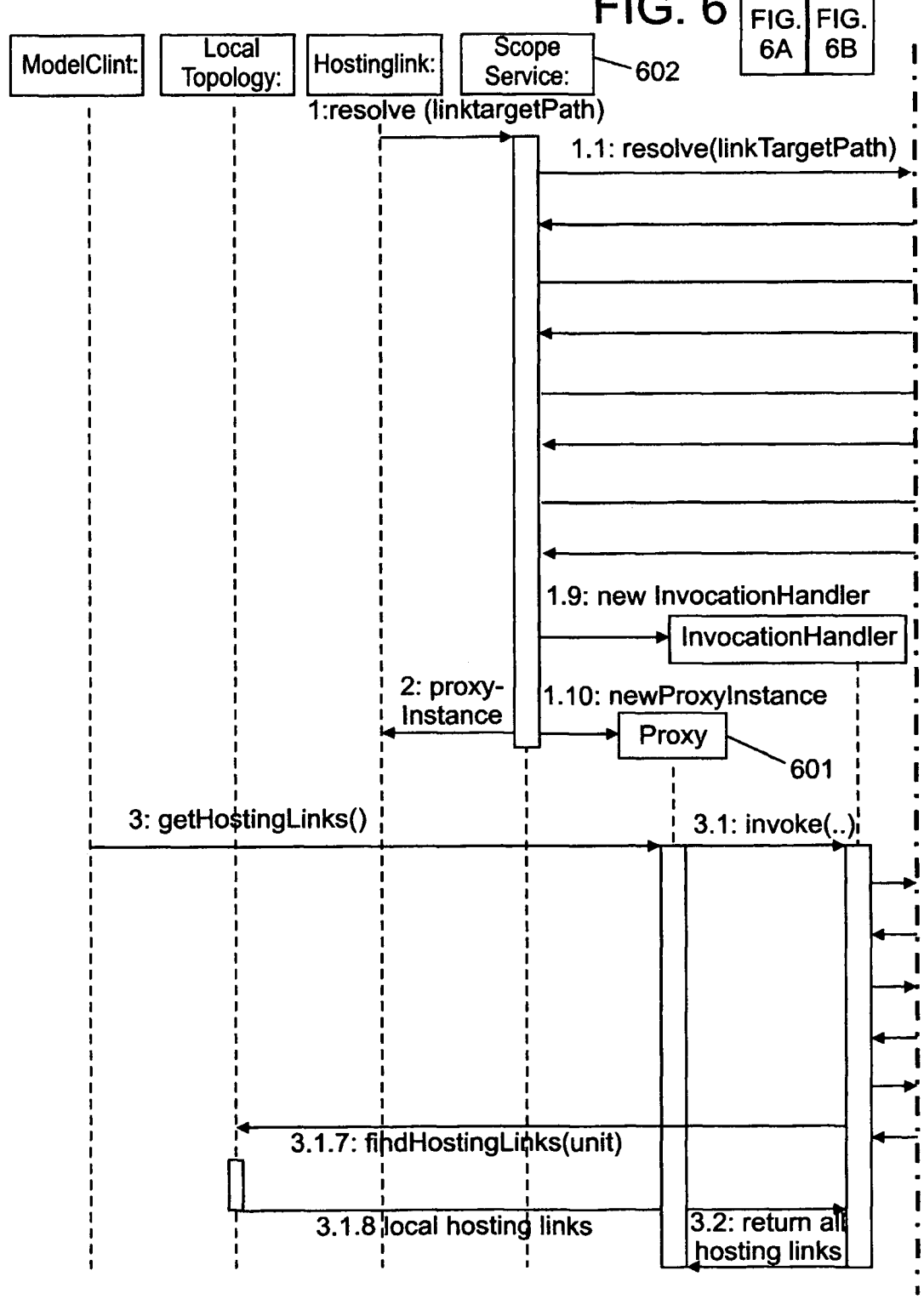

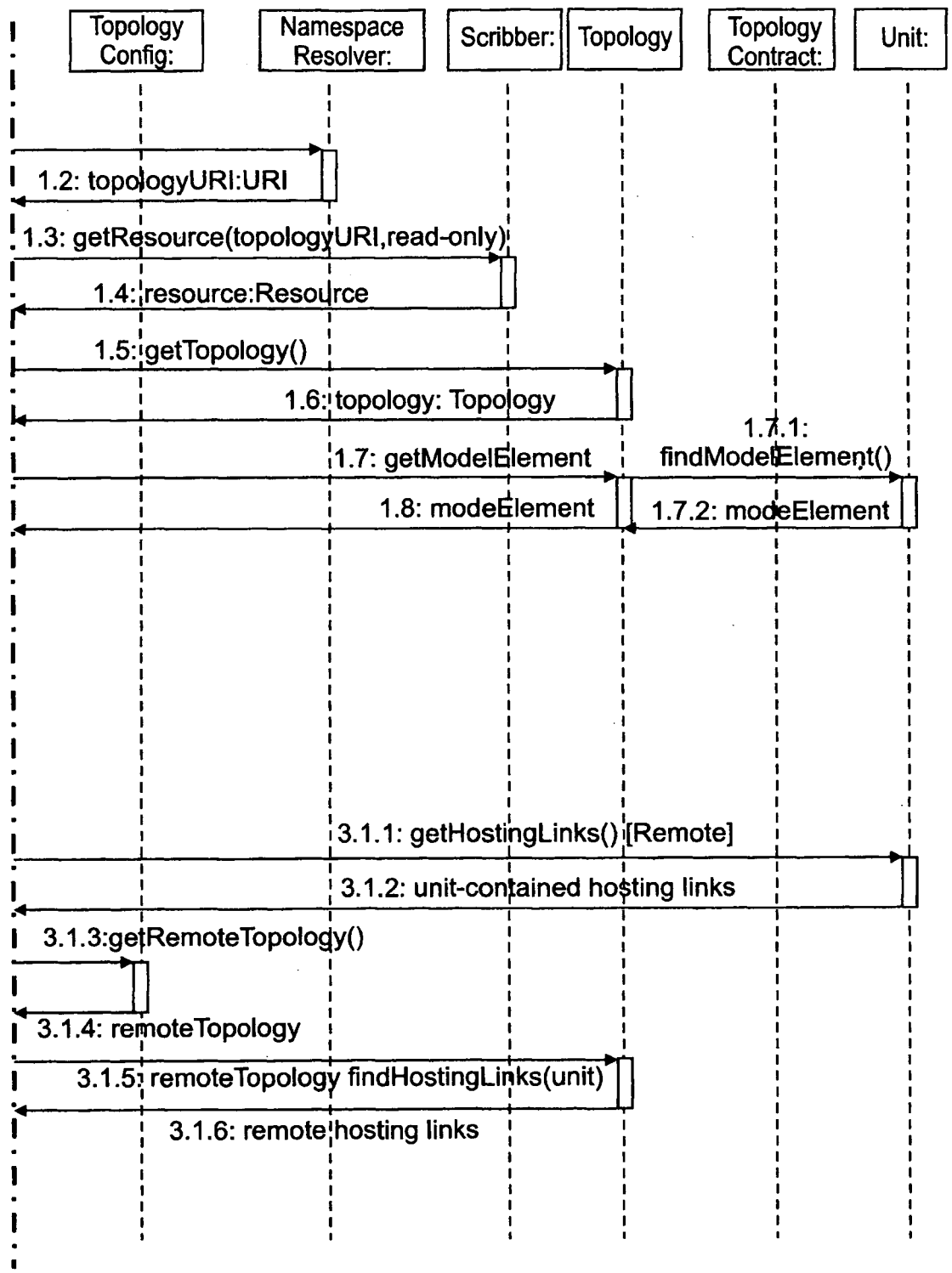

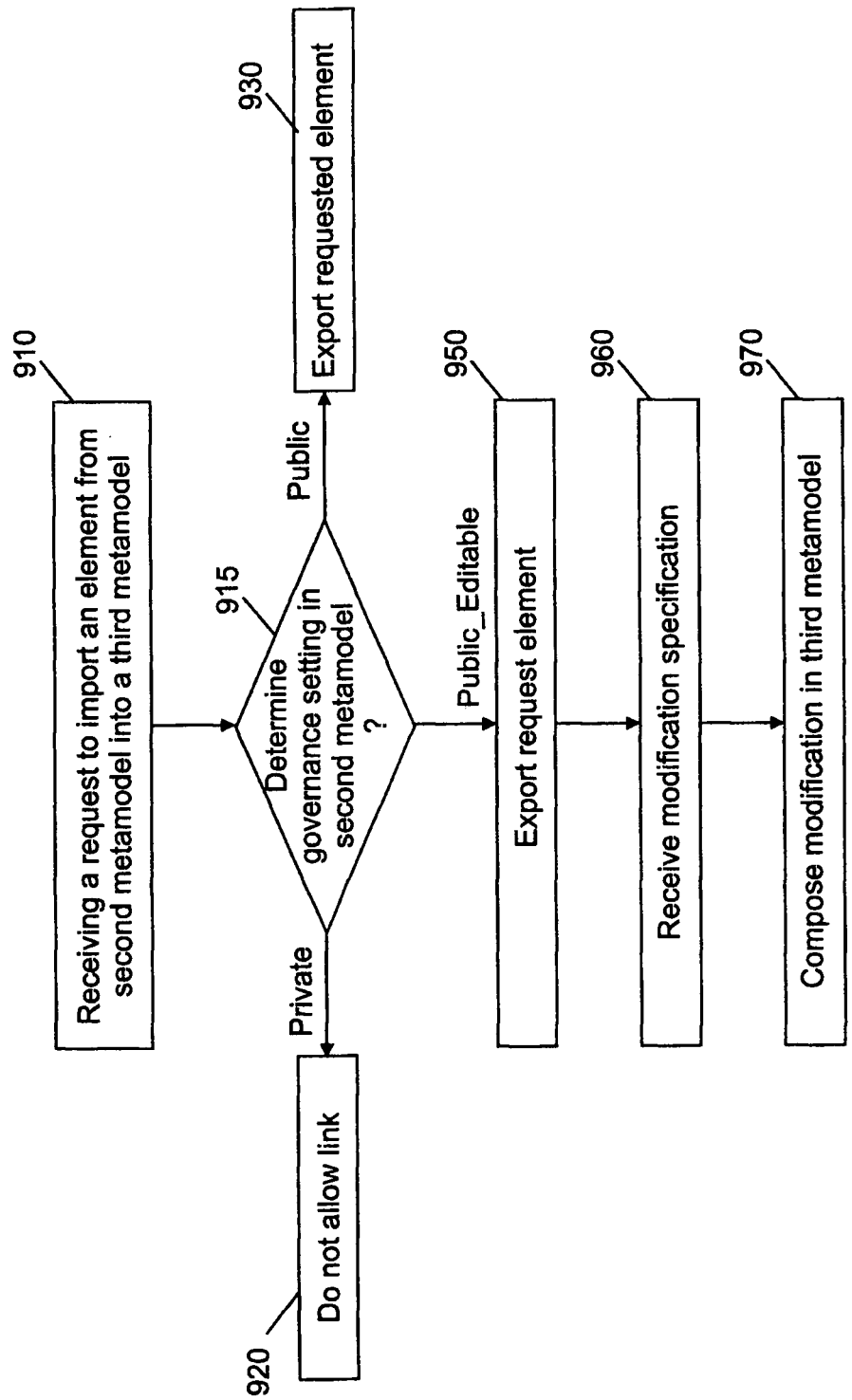

METHOD AND SYSTEM FOR ENCAPSULATION AND RE-USE OF MODELS

CROSS-REFERENCE TO RELATED APPLICATIONS

This application is related to co-pending applications U.S. Ser. No. 12/141,495 and U.S. Ser. No. 12/181,737.

FIELD OF THE INVENTION

The invention relates to the field of modeling computer system architecture and more particularly to a method and system for encapsulation and re-use of a model.

BACKGROUND

Existing modeling techniques, such as Unified Modeling Language (UML), allow users to build models of software architecture. The Rational Deployment Architecture Platform from IBM for simplified deployment modeling allows users to build models of Information Technology (IT) system architectures. Unlike previous modeling techniques, which are primarily focused on the type of system (e.g., prototypical instances), the Rational Deployment Architecture Platform is an instance-based modeling platform to describe configuration of specific instances to be deployed in a target IT system environment.

SUMMARY

According to an embodiment of the present invention, a method is provided for encapsulation and re-use of a model. The method comprises creating a governance contract governing the exportation and modification of elements of the model by other models. The governance contract comprising at least one governance setting, and each element of the model has a governance setting. In response to a request to import at least one element of the model into a second model, the method comprises exporting the requested at least one element by reference only if the element has a governance setting that allows for exportation. In response to a request to modify at least one imported element of the model in the second model, the method comprises determining the governance setting for said element. The method further comprises modifying said element by composing the modification in the second model only if the element has a governance setting that allows modification. According to a sample embodiment, modifying an element may comprise changing a value of an element property, or augmenting properties of an element. According to a sample embodiment, the method may further comprise hiding each element of the model that has a governance contract that does not allow exportation of that element.

According to a sample embodiment, the model is a source model and has defined a variable and set at least one attribute to the variable. The second model is a target model and defines a value for the variable. The value defined in the target model is assigned to the attribute in the target model.

According to a sample embodiment, the element imported from the first model into the second model is imported from the second model into a third model. Exportation of the at least one element from the second model and modification of the at least one element in the third model are governed by a governance contract in the second model.

According to another embodiment of the present invention a method is provided for importing a first instantiated model into a second model and modifying at least one element from the first model in the second model. The method comprises receiving a request to import at least one element of the first model into the second model; importing instantiated elements of the first model into the second model; receiving specification of modifications to at least one element of the first model; and instantiating in the second model the specified modifications to the at least one specified element. According to a sample embodiment, the first instantiated model comprises at least one governance setting governing exportation of the at least one element from the first instantiated model. In response to receiving a request to import at least one element of the first model into the second model, the method comprises determining the at least one governance setting for the at least one element, and importing instantiated elements of the first model comprises importing only instantiated elements of the first model with governance settings that allow exportation into the second model. According to a sample embodiment, the first instantiated model comprises at least one governance setting governing modification of at least one element, and further comprises instantiating in the second model only the specified modifications to elements having a governance setting that allow modifications.

According to another sample embodiments of the present invention, a computer platform for modeling deployment of computer systems is provided. The computer modeling platform comprises: a user interface for entering at least one governance contract for a first model and for requesting modifications of a second model; memory for storing the first and second models; and a processor executing a program of instruction to: create a governance contract comprising at least one governance setting governing the exportation and modification of attributes of elements from the first model by other models; in response to a request to import at least one element of the model, export by reference only elements with a governance setting that allows for exportation; in response to a request to modify at least one imported element in the second model, determine the governance setting for said element; and modify said element only if said element has a governance setting that allows modification by composing the modification in the second model.

According to another sample embodiment of the present invention comprises a computer program product comprising a computer-readable medium having encoded thereon: program code for creating a configuration contract governing the exportation and modification of attributes of elements of a model by other models using a default governance setting; program code for defining on a unit basis governance settings that are exceptions to the default governance setting; program code for, in response to a request to import at least one element of the model into a second model, exporting to the second model by reference only requested elements with a governance setting that allows for exportation; program code for, in response to a request to modify at least one imported element in the second model, determining the governance setting for said element; and program code for modifying said element only if said element has a governance setting that allows modification by composing the modification in the second model.

BRIEF DESCRIPTION OF THE DRAWINGS

The features and advantages of the invention will be more clearly understood from the following detailed description of the preferred embodiments when read in connection with the accompanying drawing. Included in the drawing are the following figures:

FIG. 6 shows a sequence of events for finding hosting links for a model import according to a sample embodiment of the present invention;

FIG. 9 is a flow diagram of a method for importing an element previously imported into a second model into a third model according to a sample embodiment of the present invention.

DETAILED DESCRIPTION

Previous modeling techniques have a general notion of model references, allowing one model to reference information from another model. However, none of these previous techniques allow modification of an element from the original model without actually modifying the referenced element. Nor do previous modeling techniques provide a way to define an encapsulation of the instance of the meta-model types in such a way that they can be exposed in a holistic way for a complete model or at an individual type that is defined at the nth level in the model.

For issues of deployment, it is desirable for configuration models to be able to describe different pieces of an IT system architecture in a way that is re-usable and easy to maintain. For example, once a test environment is known, and a model exists which captures the state of the test environment, it is desirable for a user to be able to describe how an application can be deployed into the test environment without replicating the entire application or test environment model. Similarly, once a user describes the bindings of an application to a single environment, the user or another user may desire to use the core application model without having to perform a complete copy and modify approach for every deployment. Additionally, a user may need to encapsulate the entire test environment model or individual elements of the model to govern the reference to the elements in that model from a variety of other models that reference it.

The present invention provides a method, apparatus and program product for encapsulation and re-use of a model. While the description herein refers to instance-based models, the invention can also be practiced with models that declare type and instance. A modeling platform enables users to import elements of one model into another model by reference or even to import an entire model into another model. Attributes of the imported elements may be modified in the importing model. Because the modifications are held within the importing model they do not affect the exporting model or other models that import the same element. This enables the exporting model elements to be re-used for a variety of environments. The models also provide governance settings in the form of a governance contract that govern exportation, modification, or both exportation and modification of elements of the model, providing encapsulation of model elements.

Figure 1:
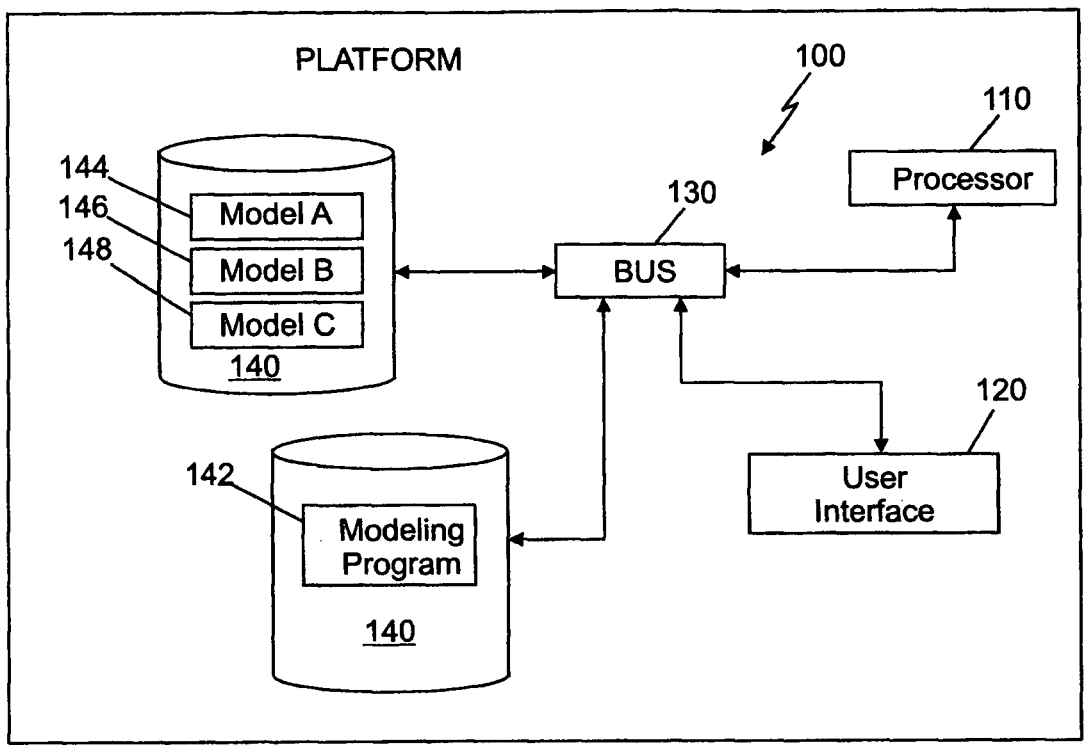
FIG. 1 is a block diagram of a modeling platform providing encapsulation and re-use of models according to a sample embodiment of the present invention.

FIG. 1 is a block diagram of a modeling platform 100 providing encapsulation and re-use of a model according to a sample embodiment of the present invention. The platform 100 may operate on a server, such as Intel x86 or zSeries environment, or on a general purpose computer. The server may be part of a distributed computing environment comprising a plurality of hardware and/or software devices linked together by a network (not shown). The network may be used by a variety of users to model different phases or aspects of a computing architecture or topology.

The modeling platform 100 comprises a processor 110 which is connected with a user interface 120 and at least one memory 140 via a bus 130. The user interface is used for entering a governance contract for a first model. The governance contract governs whether or not elements of the first model may be exported, whether or not elements may be modified in another model, or both. The governance contract comprises at least one governance setting, which may be a default governance setting or may be a governance setting for one or more specific elements. According to the illustrated embodiments, the governance settings comprise: private, public, and public editable. Elements with a governance setting of private can not be the target or source of a link, and therefore can not be exported. Elements with a governance setting of public can be linked, and therefore exported, but can not be modified in an importing model. Elements with a governance setting of public editable may be linked and modified.

Figure 2:
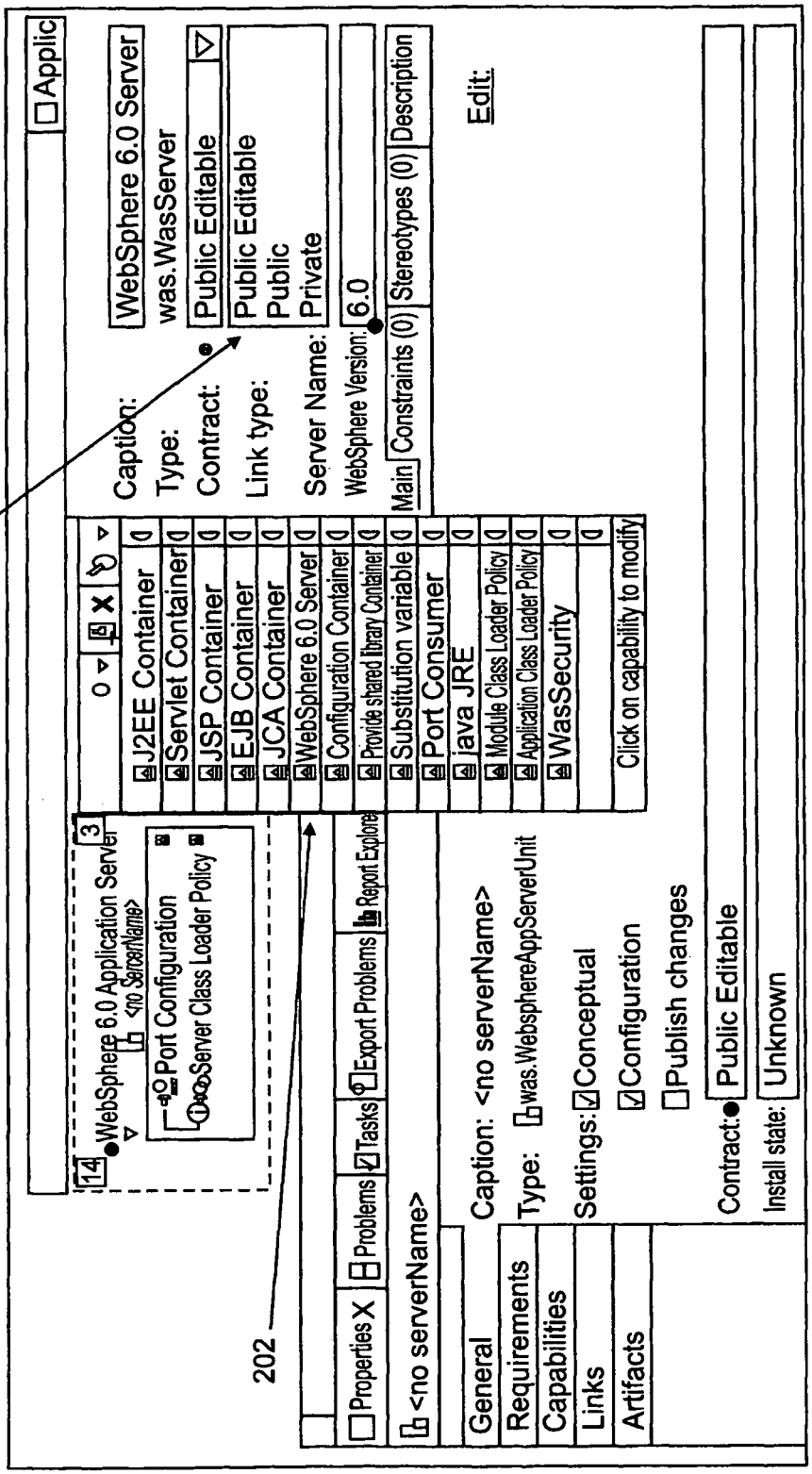
FIG. 2 illustrates a screen view of a user interface showing a server definition and governance setting.

FIG. 2 illustrates a screen view 220 of a user interface 120 showing a server definition and governance setting. In the illustrated embodiment, a model is defined for a Websphere Application Server v6.0 202. The governance setting 210, also called a visibility, is selected as Public Editable in the illustrated embodiment. The user interface 120 may be menu driven, as shown, with a user pulling down a variety of menus and making selections from the menus. It should be understood, however, that other user interface configurations are contemplated within the scope if the present invention, such as drag and drop.

Figure 3:
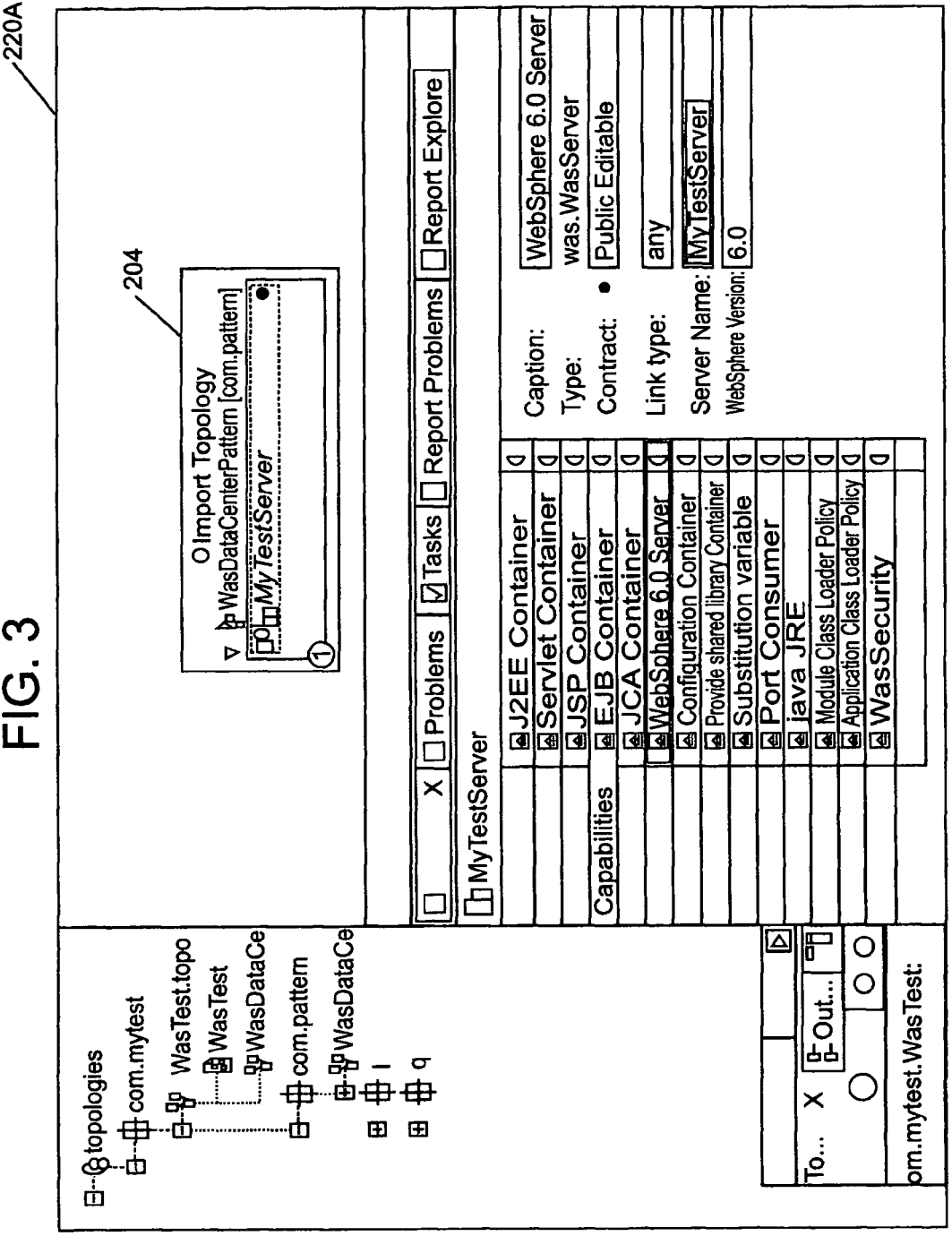
FIG. 3 illustrates a screen view of a user interface showing modification of a server name element.

A user also uses the user interface 120 to import and modify model elements in other models. A model may be imported into another model by dragging the source model onto the canvas of the target model. For example. In FIG. 3, a screen view 220A of a user interface shows a WasDataCenterPattern model is imported into WasTest topology by dragging the source model onto the canvas of the target model creating a model linkage 204. Alternatively, one model may be imported into another model by entering the name of the source model to be imported into a dialog box opened in the target model, or any other suitable technique for designating the source and target models for import. Again, other configurations of the user interface are also contemplated. FIG. 3 also shows that the name of the name attribute of the WasTest is modified by changing it to MyTestServer in the import topology linkage 204.

Figure 4:
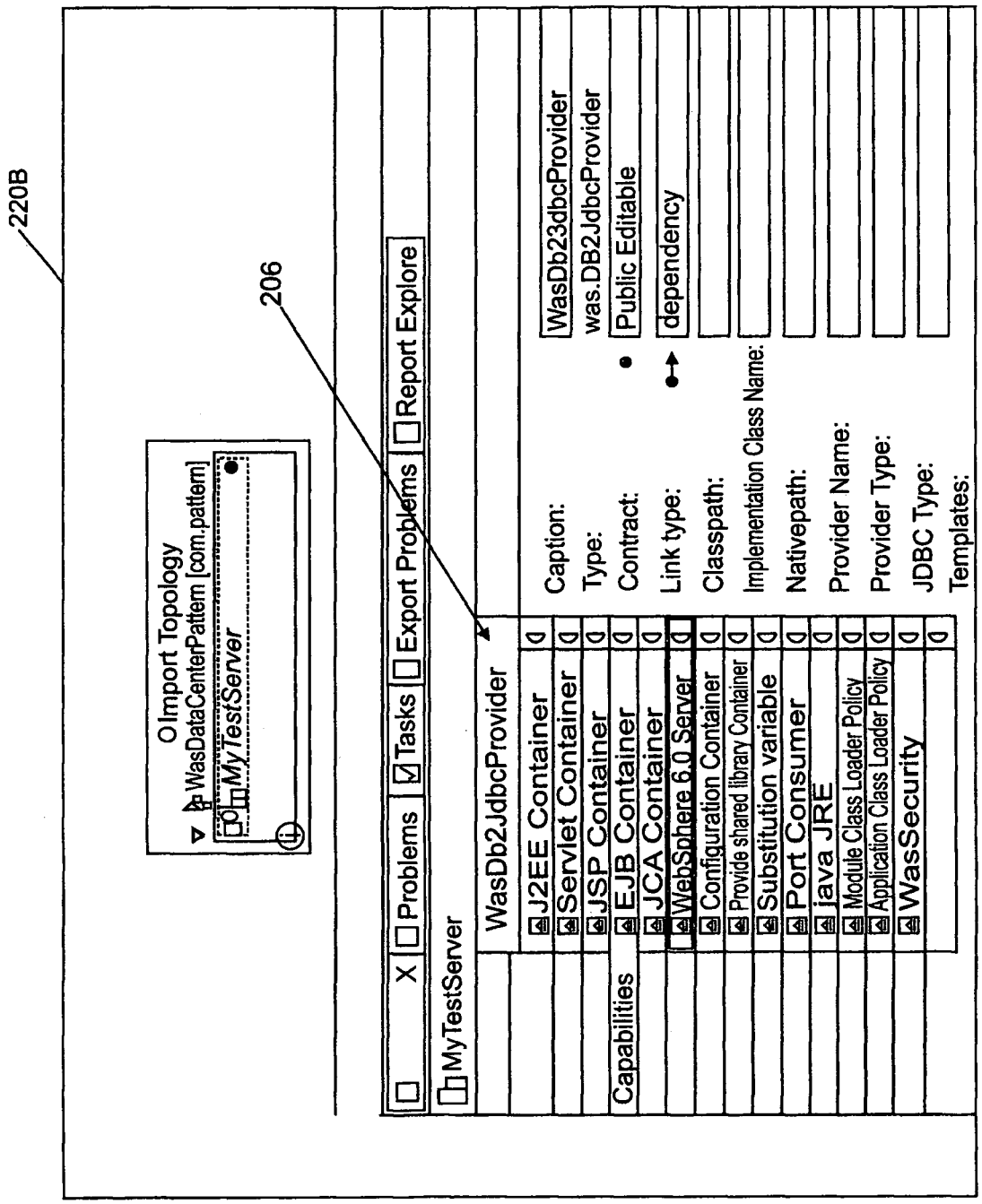
FIG. 4 illustrates a screen view of a user interface showing augmentation of an imported model.

In FIG. 4, another screen view 220B of the user interface 120 shows modification to elements from the imported model. The process, described as augmentation, enables a target model to modify list-based data structures originating from the source model. In the illustrated embodiment, a new capability, WasDb2JdbcProvider 206 is added to MyTest- Server. The augmentation of the imported model is stored with the instance configuration of the import without any modification to the imported model, the topology being imported into a second model remains unchanged in the first model.

Returning to FIG. 1, memory 140 may comprise one or more memory devices. The memory devices may be permanently resident in the model platform computing device, such as a hard drive or the like. Alternatively they comprise portable computer-readable media such as compact disc, flash drive, and the like, installed in a drive in the platform computing device. The memory may also be a remote device connected to the platform computing device through a network.

A first model 144 and a second model 146 are stored on memory 140. A modeling program 142 is also stored on memory 140.

The processor 110 executes the modeling program 142 stored on memory 140. The processor 110 executing the modeling program creates a governance contract comprising at least one governance setting governing the exportation and modification of attributes of elements from the first model by other models. According to a sample embodiment, the governance contract is created interactively with a user through a user interface 120 as described above.

According to a sample embodiment, the governance contract comprises a default governance setting and at least one exception governance setting, providing a governance setting different from the default governance setting for at least one element of the first model. According to a sample embodiment, each element has only one governance setting.

When a user requests to import at least one element of the first model, the processor 110 executing the modeling program 142 exports by reference elements with a governance setting that allows for exportation. In the present sample embodiment elements with a governance setting of public and public editable would be exported. Elements with a governance setting of private would not be exported, because they can not be the source or the target of a link.

When a user requests to modify at least one element from the first model in the second model, the processor 110 execute the modeling program 142 modifies the requested elements in the second model that have a governance setting that allows modification. In the present sample embodiment elements with a governance setting of public editable would be modified.

The modifications are made in the second model without affecting the elements in the first model by composing the modification in the second model. Modifications are stored with the instance configuration of the import in the second model.

Figure 5A:
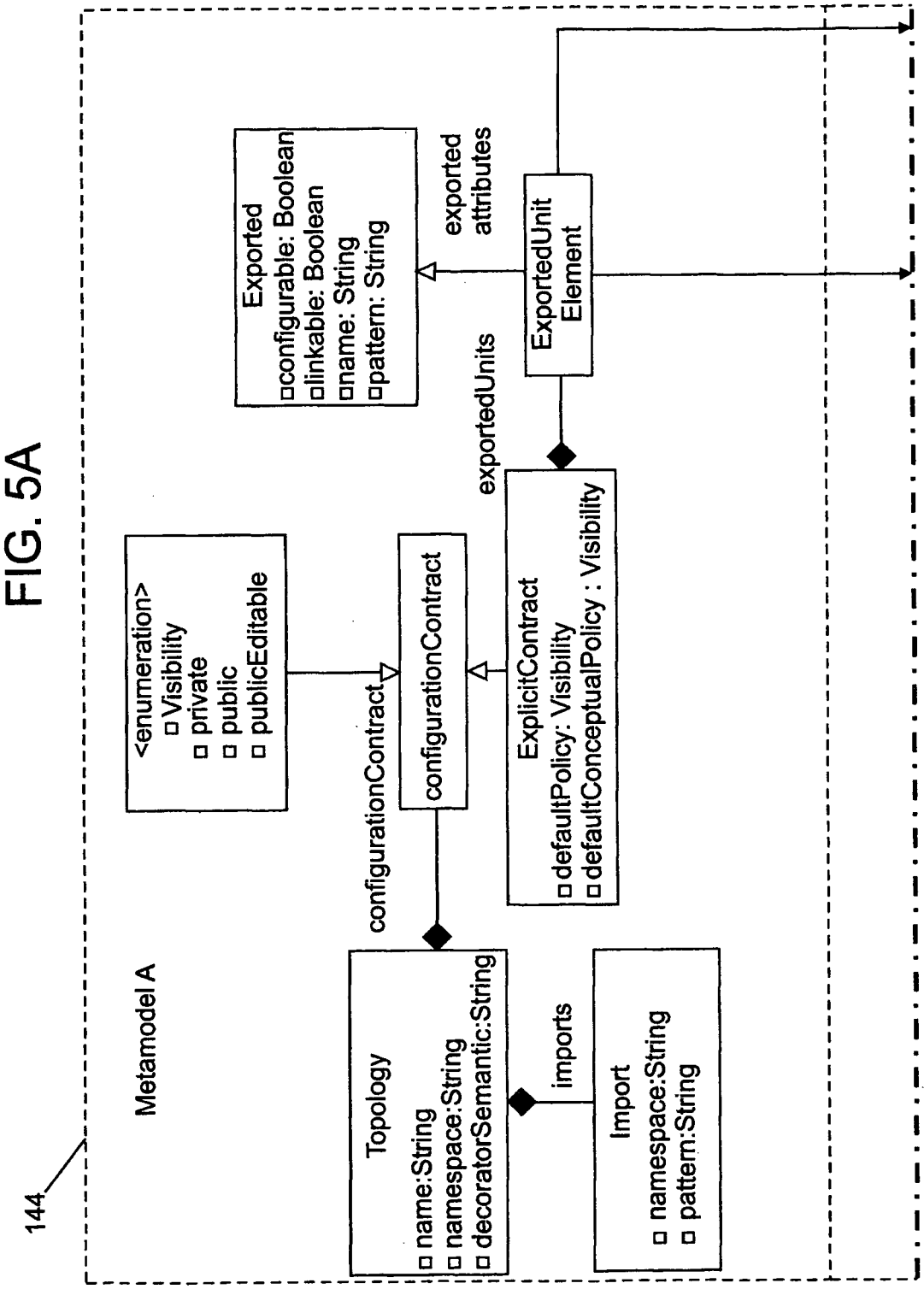
FIG. 5 is a diagram of a sample topology model of a modeling platform providing encapsulation and re-use of instance-based models according to a sample embodiment of the present invention.

FIG. 5 is a diagram of a sample topology model of a modeling platform providing encapsulation and re-use of models according to a sample embodiment of the present invention. When a topology imports another topology, an instance 530 of IMPORT is created for each of the import reference. This instance holds the qualified namespace and a pattern for identifying the topology being imported. To allow for modification, changes in attribute value or augmentation, an instance of an Instance Configuration 540 is defined that is contained by the import. This allows for only the exportable elements that have been defined as allowing exportation (in the present embodiment those elements defined as Public or Public Editable) from the imported topology to be visible in the importing topology. Only those elements that are visible in the importing topology may be referenced.

The Instance Configuration 540 also allows for only the elements that have been defined as allowing modification (in the present embodiment those elements defined as Public Editable) from the imported topology to modified such as by changing a value for an attribute or an element or addition of an attribute or an element. Elements may comprise, for example, requirements or capabilities. The modified information is stored with the instance configuration 540 of the import in the importing topology and the imported topology is not modified in any way. This allows one or more users to import a topology into multiple topologies and specify modifications specific to each importing topology. Furthermore, the topology that contains the import reference can re-export the visible elements of the imported topology and encapsulate them for its own import using the visibility settings described above on the imported elements.

The modifications, both the attributes that are changed 510 and the augmentations 520 are composed in the importing model (MODEL B 146) instantiation 530 and stored in the Instance Configuration 540 for MODEL B 146 along with attributes that are imported and not modified.

The imported elements are referenced by implementation of a highly advanced facade using Java Proxies and model manipulation techniques to provide real-time in-memory combination of substituted values as well as combination of lists from the imported topology with augmented elements (added to the list).

The facade dynamically creates a delegate object, which satisfies the same set of interfaces defined by a proxified object. Each method within the delegate defines a set of important methods on a per-type basis, enabling very fine grained customization of the behavior of the proxified object. General purpose methods (e.g. all methods that begin "set" or "get") are handled automatically, and their results are proxified using the same technique as the first proxified object. The resultant behavior enables an in-memory mirror of the original model, where each delegate method of interest (e.g. "setValue") can be intercepted, and the updated value can be persisted to the referencing model unbeknownst to the client invoking the API.

More advanced logic handles the in-memory amalgamation of list structures, enabling list data structures of the source model to be seamlessly combined with augmented list content from the referencing model. Hence, to a client interface a proxified list appears to have all of the original elements, as well as additional augmented elements. Yet the client is unaware of which elements were in the original model and which are actually contained by the referencing model.

The façade implementation provides for in-memory reconstruction of the modified state including changed state and augmented state, as well as specialized behavior so that certain methods can be special-cased. For example, if the object model defines a mechanism to resolve objects based on a string-based path, the proxified delegate might implement specialized behavior so that when it resolves contained objects from the context of the referencing model, it properly proxifies those instances, enabling a seamless proxified mirror of the source model. Alternatively, security mechanisms can enforce the proper governance specification indicated by the source model for some or all of the source model, allowing each intercepted method to be validated based on the permissions of the caller of the delegate method.

FIG. 6 shows a sequence of events for finding hosting links for a model import according to a sample embodiment of the present invention. In this embodiment, a user may find the aggregated set of hosting links that are defined in a current topology and visible links from the imported topology by making the call to a simplified method 'getHostingLinks'3 on element within the current topology. The proxy layer 601 is invoked seamlessly without any additional requirements from the user (client) invoking the proxy layer. The proxy layer takes care of finding the hosting links that are visible from the imported topology. Additionally, ScopeService 602 is used to provide a facade to the topology and the imports within it as it resolves the topology reference to either the current topology or to the imported topology.

In effect, the ScopeService provides a management layer to resolve objects in the context of the source model and return proxified references to them. Once returned, all methods on the proxified object that return values will be proxified as needed. In effect, the ScopeService is the gatekeeper to all source models from the context of a single referencing model.

Figure 7:
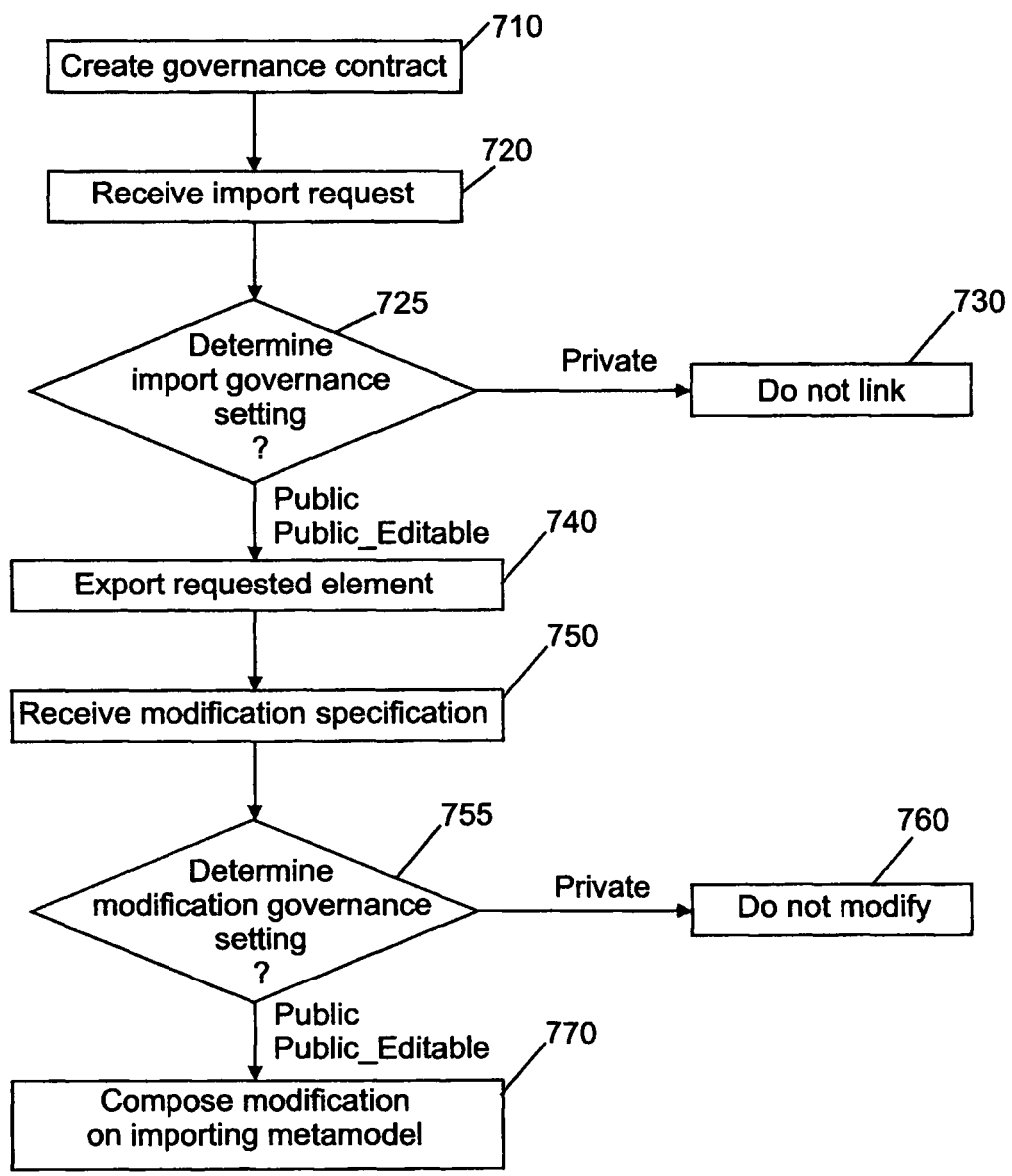
FIG. 7 is a flow diagram of method for importing a first model into a second model and modifying an imported element according to a sample embodiment of the present invention.

FIG. 7 is a flow diagram of method for importing a first model into a second model and modifying an imported element according to a sample embodiment of the present invention. A user selects a governance setting using user interface 120 during creation of a first model 144. The modeling program 142 uses the governance setting selection to create a governance contract (step 710). The governance contract is composed in the first model 144.

A user requests to import at least one element from the first model into a second model 146 using the user interface 120. As described above, this request may take the form of a menu selection, a drag and drop action, or any other selection mechanism suitable for a user interface. In response to the request to import at least one element from the first model 144 into the second model 146, the modeling program 142 determines the governance setting for importing for the requested element(s) (step 725). According to a sample embodiment, the governance setting is exposed through the contract of the source model, which determines the proper visibility of the source object.

If the governance setting for the element requested for import is one that allows linking and, therefore importing, then the first model 144 exports the requested element (step 725). The requested element is exported by creating a link to it in the second model 146 and creating an import instance in the second model 146. According to the illustrated example, governance settings that allow export are Public and Public-Editable. If the governance setting is one that does not allow linkage, and therefore importing, then the modeling program does not allow a link to be created to it (step 730). While the governance settings in the illustrated example are 'Private', 'Public', and 'Public_Editable' and govern both importing and modification, other governance schemes may be devised within the scope of the invention, including schemes with more or fewer settings and setting that govern only importing or only modification.

A user, who may or may not be the same user as discussed above, may desire to modify at least one imported element in the second model 146. To do this he/she specifies the desired modification. The desired modification may be specified by selecting an element from a graphical representation of the second model 146 on the user interface 120 with a mouse or the like and entering the modification in a dialog box that is presented in response to the selection, for example. The desired modification may alternatively be specified using a variety of other mechanisms known for entering data through a user interface 120.

In response to receiving the modification specification, the modeling program 142 determines the whether or not the governance setting allows for modification (step 755). This determination mat be accomplished, for example, by retrieving the governance setting for the specified element and comparing it to the governance settings which allow for modification. Alternatively, the modeling program 142 may hide elements with governance settings that do not allow modification, so that they can not be specified.

If the governance setting for the specified element allows for modification, then the modeling program 142 modifies the element in the second model 146 (step 770) by composing the modification in the instance configuration of the second model 146. If the governance setting does not allow for modification, then the modeling program does not allow modification in the second model 146. Modifications may take the form of a change to a value for an attribute of the specified element or augmentation by addition of an attribute for the specified element.

Figure 8:
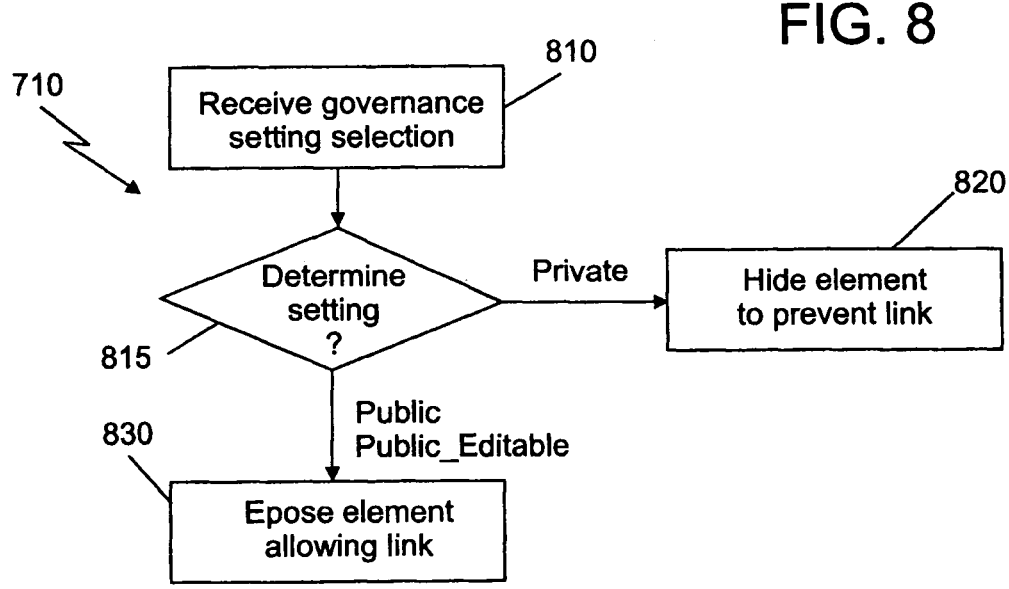
FIG. 8 is a flow diagram of a method of hiding an element with a governance setting that does not allow it to be imported into another model according to a sample embodiment of the present invention.

FIG. 8 shows details of the step of creating a governance contract (step 710) according to a sample embodiment of the present invention. In this illustrated embodiment, the modeling program 142 receives a governance setting selection from a user through the user interface 120 (step 810). In response to receiving the governance setting selection, the modeling program 142 determines whether the selected governance setting allows for exporting (step 815). If the governance setting does not allow for export (a setting of 'Private' in the illustrated example), then the modeling program 142 hides the selected element in representation of the model on the user interface 120 (step 820), thereby preventing a user from selecting that element for linking and import into another model. If the governance setting allows for export (a setting of 'Public' or 'Public_Editable' in the illustrated example), then the element is exposed in representation of the model on the user interface 120 (step 830), thereby allowing a user to select that element for linking and import into another model.

FIG. 9 is a flow diagram of a method for importing an element previously imported into a second model into a third model according to a sample embodiment of the present invention. A user requests to import an element that has been imported into the second model 146 from the second model 146 into a third model 148 through the user interface 120. The modeling program receives the request (step 910). In response to receiving this request, the modeling program 142 determines the governance setting in the second model 146 for the requested element (step 915). If the governance setting for the requested element does not allow for import ('Private' in the illustrated embodiment), then the modeling program 142 does not allow a link to the requested element and it can not be imported (step 920).

If the governance setting (or settings) in the second model 146 allow export but do not allow modification ('Public' in the illustrated embodiment), then the modeling program 142 exports the requested element from the second model 146 and imports it to the third model 148 (step 930). The element is imported to the third model 148 by composing the element in the instance configuration 540 of the third model 148. The modeling program 142 does not allow modification of the element in the third model (step 940

The modeling program can enforce the governance setting by active checking or passive checking by the client of the proxified object. An active checking scheme would enforce that for every invocation of a delegate, intercepted method call, the correct permissions were available to the caller. Improper permissions would trigger the relevant security exceptions and log messages, preventing the user from completing their requested modification. Alternatively, for reasons of performance or high-trust environments, passive checking would require that clients ask permission prior to calling any method that might modify a proxified object. The action might even disable itself in the UI as a result of this check to prevent an action by the user that would conflict with effective model management.

If the governance setting (or settings) in the second model 146 allow export and allow modification ('Public_Editable' in the illustrated embodiment), then the modeling program 142 exports the requested element from the second model 146 and imports it to the third model 148 (step 950). The element is imported to the third model 148 by composing the element in the instance configuration 540 of the third model 148. Then, when the modeling program receives a response to specification of a modification, which may be either a change or an augmentation, (step 960), the modeling program composes the modification in the third model 148 (step 970).

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer-readable medium may be any apparatus that can contain or store and communicate the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable media, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method for encapsulation and re-use of a model, comprising:
   creating a governance contract governing the exportation and modification of elements of the model by other models, the governance contract comprising at least one governance setting, at least one element of the model having a governance setting, wherein the governance contract defines at least one of an exportation governance setting and modification governance setting of the elements of the model:
   in response to a request to import an element of the model into a second model, exporting the requested element by reference if the element has a governance setting that allows for exportation;
   in response to a request to modify an imported element of the model in the second model, determining the governance setting for said imported element; and
   modifying said imported element by composing the modification in the second model if the element has a governance setting that allows modification.

2. The method of claim 1, wherein said request to import an element of the model comprises dragging and dropping the element to the second model on a graphical user interface.

3. The method of claim 1, wherein said request to import an element of the model comprises selecting an import action in a menu on a graphical user interface.

4. The method of claim 1, wherein modifying said element comprises changing a value of said element property.

5. The method of claim 1, wherein modifying said element comprises augmenting properties of said element.

6. The method of claim 1, further comprising hiding each element of the model that has a governance contract that does not allow exportation of said element.

7. The method of claim 6, wherein the request to import an element of the model into a second model comprises a request to import a visible element from the model.

8. The method of claim 1, wherein the model has defined a variable and set at least one attribute to the variable, and wherein the second model defines a value for the variable, further comprising assigning said value to said attribute.

9. The method of claim 1, further comprising importing said element from the second model into a third model, wherein exportation of said element from the second model and modification of said element in the third model are governed by a governance contract in the second model.

10. The method of claim 1, wherein creating a governance contract comprises creating a default governance setting and adding at least one element specific governance setting that is an exception to the default governance setting.

11. A method for importing a first instantiated model into a second model and modifying at least one element from the first model in the second model, wherein the first instantiated model comprises at least one governance setting governing exportation of the at least one element from the first instantiated model, and wherein a governance contract defines the governance settings of each of the at least one element of the first instantiated model, the method comprising:
   receiving a request to import at least one element of the first model into the second model;
   importing instantiated elements of the first model into the second model receiving specification of modifications to at least one element of the first model; and
   instantiating in the second model the specified modifications to the at least one specified element.

12. The method of claim 11, in response to receiving a request to import at least one element of the first model into the second model, determining the at least one governance setting for the at least one element; and
   wherein importing instantiated elements of the first model comprise importing only instantiated elements of the first model with governance settings that allow exportation to the second model.

13. The method of claim 12, wherein the first instantiated model comprises at least one governance setting governing modification of at least one element, and further comprising: only instantiating in the second model the specified modifications to elements having a governance setting that allow modifications.

14. The method of claim 11 wherein modifying said element comprises changing a value of an attribute for said element and the changed value is composed in the second model.

15. The method of claim 11, wherein modifying said element comprises augmenting attributes of an element and the augmented attributes are composed in the second model.

16. The method of claim 14 wherein said changed value is composed as an instance of the element in the second model comprising an element name, an attribute selection, and an instantiation value.

17. The method of claim 15 wherein said augmented attributes are a list composed as an instance in the second model comprising an element name, an attribute selection, and an addition to said list.

18. A computer platform for modeling deployment of computer systems comprising:
- a user interface for entering at least one governance contract for a first model and for requesting modifications of a second model;
- memory for storing the first and second models; and a processor executing a program of instruction to:
- create a governance contract comprising at least one of an exportation governance setting and a modification governance setting governing the exportation and modification of attributes of elements from the first model by other models;
- in response to a request to import at least one element of the model, export by reference requested elements with a governance setting that allows for exportation;
- in response to a request to modify at least one imported element in the second model, determine the governance setting for said element; and
- modify said element if said element has a governance setting that allows modification by composing the modification in the second model.

19. A computer program product comprising a computer-readable medium having encoded thereon:
- program code for creating a configuration contract governing the exportation and modification of attributes of elements of a model by other models using a default governance setting, wherein the default governance setting comprises at least one of an element exportation governance setting, and an element modification governance setting;
- program code for defining on a unit basis governance settings that are exceptions to the default governance setting, wherein the governance setting defines the exportation and modification of attributes of elements from the first model by other models;
- program code for, in response to a request to import at least one element of the model into a second model, exporting to the second model by reference requested elements with a governance setting that allows for exportation; and
- program code for, in response to a request to modify at least one imported element in the second model, determining the governance setting for said element; and
- program code for modifying said element if said element has a governance setting that allows modification by composing the modification in the second model.

* * * * *